(12) United States Patent
Kelly

(10) Patent No.: US 10,637,338 B2
(45) Date of Patent: Apr. 28, 2020

(54) ROTOR FOR PERMANENT MAGNET GENERATOR

(71) Applicant: GREENSPUR RENEWABLES LIMITED, London (GB)

(72) Inventor: Hugh-Peter Granville Kelly, Westcliff on Sea (GB)

(73) Assignee: TIME TO ACT LIMITED, Hatfield, Hertfordshire (GB)

( * ) Notice: Subject to any disclaimer, the term of this patent is extended or adjusted under 35 U.S.C. 154(b) by 0 days.

(21) Appl. No.: 15/574,235

(22) PCT Filed: May 19, 2016

(86) PCT No.: PCT/GB2016/051448
§ 371 (c)(1),
(2) Date: Nov. 15, 2017

(87) PCT Pub. No.: WO2016/185218
PCT Pub. Date: Nov. 24, 2016

(65) Prior Publication Data
US 2018/0138793 A1    May 17, 2018

(30) Foreign Application Priority Data

May 19, 2015  (GB) .................................. 1508567.3

(51) Int. Cl.
*H02K 1/27* (2006.01)
*H02K 21/24* (2006.01)
*H02K 16/00* (2006.01)

(52) U.S. Cl.
CPC ........... *H02K 21/24* (2013.01); *H02K 1/2793* (2013.01); *H02K 16/00* (2013.01); *H02K 2201/00* (2013.01)

(58) Field of Classification Search
CPC ........ H02K 1/27; H02K 16/00; H02K 1/2793; H02K 1/30; H02K 7/083; H02K 2201/03; Y02E 10/725
(Continued)

(56) References Cited

U.S. PATENT DOCUMENTS

| 3,375,386 A | * | 3/1968 | Hayner | .................... H02K 3/26 310/268 |
| 7,081,696 B2 | * | 7/2006 | Ritchey | .................. H02K 7/108 310/114 |

(Continued)

FOREIGN PATENT DOCUMENTS

| CN | 1897419 | 1/2007 | |
| CN | 102624115 A | * 3/2012 | ............... H02K 1/27 |

(Continued)

OTHER PUBLICATIONS

EPO machine translation of Cui et al. (CN 102624115 A), 2012, all pages, Rotor for axial gap type dynamo-electric motor, has auxiliary permanent magnets fixed on rotor yoke, where two magnetic poles of auxiliary permanent magnets are respectively connected with two sides of main permanent magnets. (Year: 2012).*

(Continued)

*Primary Examiner* — Naishadh N Desai
(74) *Attorney, Agent, or Firm* — Quarles & Brady LLP

(57) ABSTRACT

A rotary generator comprising: at least one magnetic annulus pair comprising a first magnetic annulus and a second magnetic annulus with a gap therebetween; a coil annulus in the gap; the first and second magnetic annuli and the coil annulus having a common axis; the first and second magnetic annuli of the at least one magnetic annulus pair each having: a sequence of principle permanent magnets spaced around the common axis with alternating north and south (Continued)

poles facing the gap, corresponding principle permanent magnets of the first and second magnetic annuli of a magnetic annulus pair, with unlike poles facing the gap, facing each other across the gap such that lines of magnetic flux cross the gap between the corresponding principle permanent magnets, and a sequence of intermediate permanent magnets, each of the intermediate permanent magnets being positioned between two of the principle permanent magnets, each intermediate permanent magnet having adjacent the gap a north pole facing a side of the principle permanent magnet of the two principle permanent magnets having a north pole facing the gap and each intermediate permanent magnet having adjacent the gap a south pole facing a side of the principle permanent magnet of the two principle permanent magnets with a south pole facing the gap, the coil annulus having a sequence of coils arranged around the common axis such that the lines of magnetic flux cut the turns of the coils and thus induce electric currents in the coils as the magnetic annuli are caused to rotate relative to the coil annulus, wherein the first and second magnetic annuli of the at least one magnetic annulus pair each further comprise a backing plate of ferromagnetic material, the principle permanent magnets being positioned between the backing plate and the gap and mounted to the backing plate such that adjacent principle permanent magnets are magnetically coupled to one another through the backing plate.

10 Claims, 10 Drawing Sheets

(58) Field of Classification Search
USPC ............... 310/81, 49.22, 49.42, 257, 156.01, 310/156.82–84
See application file for complete search history.

(56) References Cited

U.S. PATENT DOCUMENTS

| | | | |
|---|---|---|---|
| 2004/0041409 A1* | 3/2004 | Gabrys | H02K 19/103 290/55 |
| 2010/0001533 A1* | 1/2010 | Jefferson | H02K 21/24 290/55 |
| 2011/0121576 A1* | 5/2011 | Bayko | F03D 3/005 290/55 |
| 2012/0262019 A1* | 10/2012 | Smith | H02K 1/2766 310/156.07 |

FOREIGN PATENT DOCUMENTS

| | | |
|---|---|---|
| CN | 102 624 115 A | 8/2012 |
| CN | 102 904 404 A | 1/2013 |
| CN | 103703523 | 4/2014 |
| CN | 104 167 893 A | 11/2014 |
| EP | 1 734 645 A2 | 12/2006 |
| WO | 2013/171728 A2 | 11/2013 |

OTHER PUBLICATIONS

PCT International Search Report and Written Opinion, PCT/GB2016/051448, dated Jul. 25, 2016.
Search Report dated Nov. 25, 2015 in connection with GB1508567.3.
China National Intellectual Property Administration First Office Action and Search Report for application 2016800290919, dated Apr. 16, 2019, with translation, 16 pages.

* cited by examiner

Fig. 1a
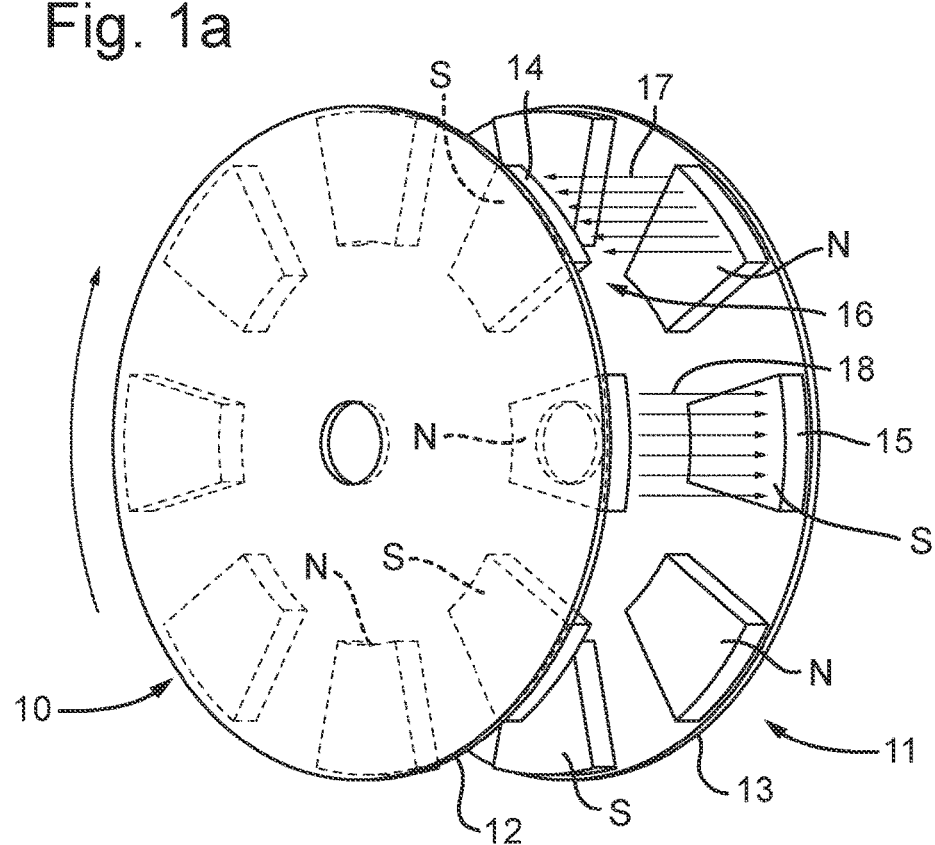
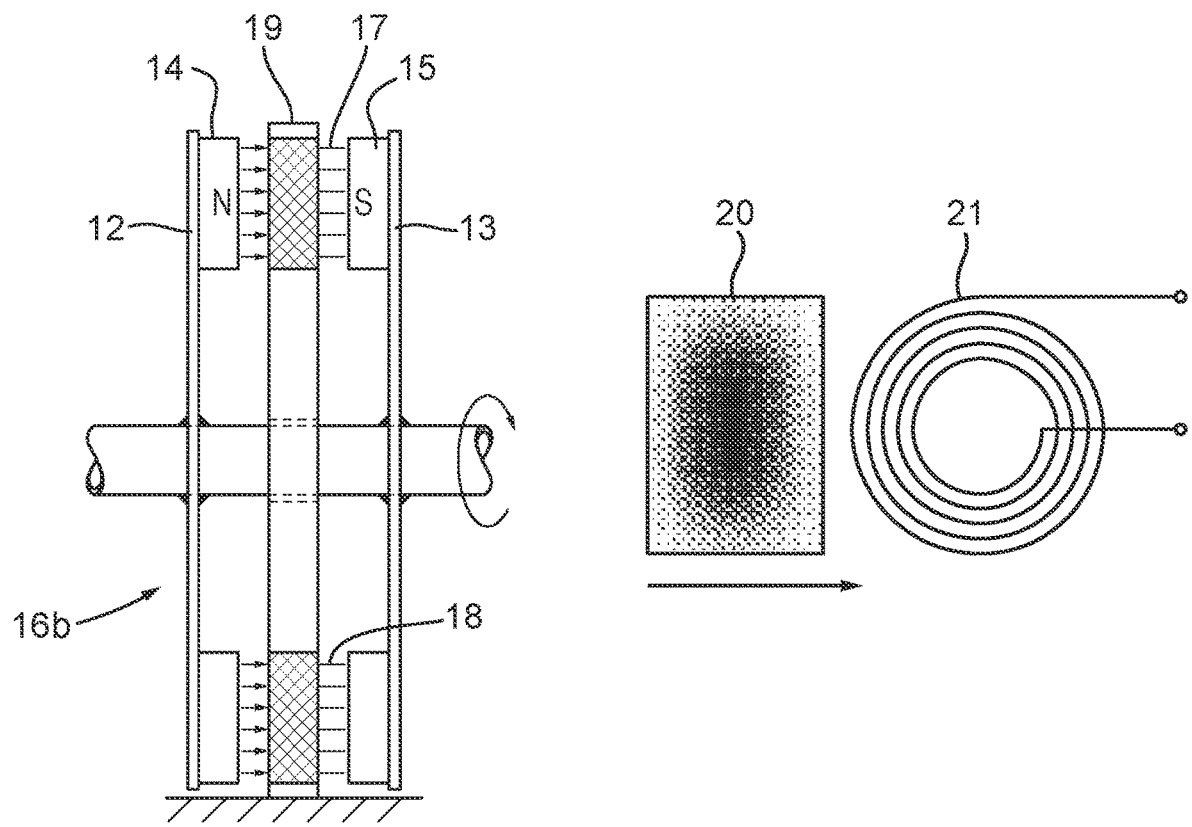

Fig. 1b
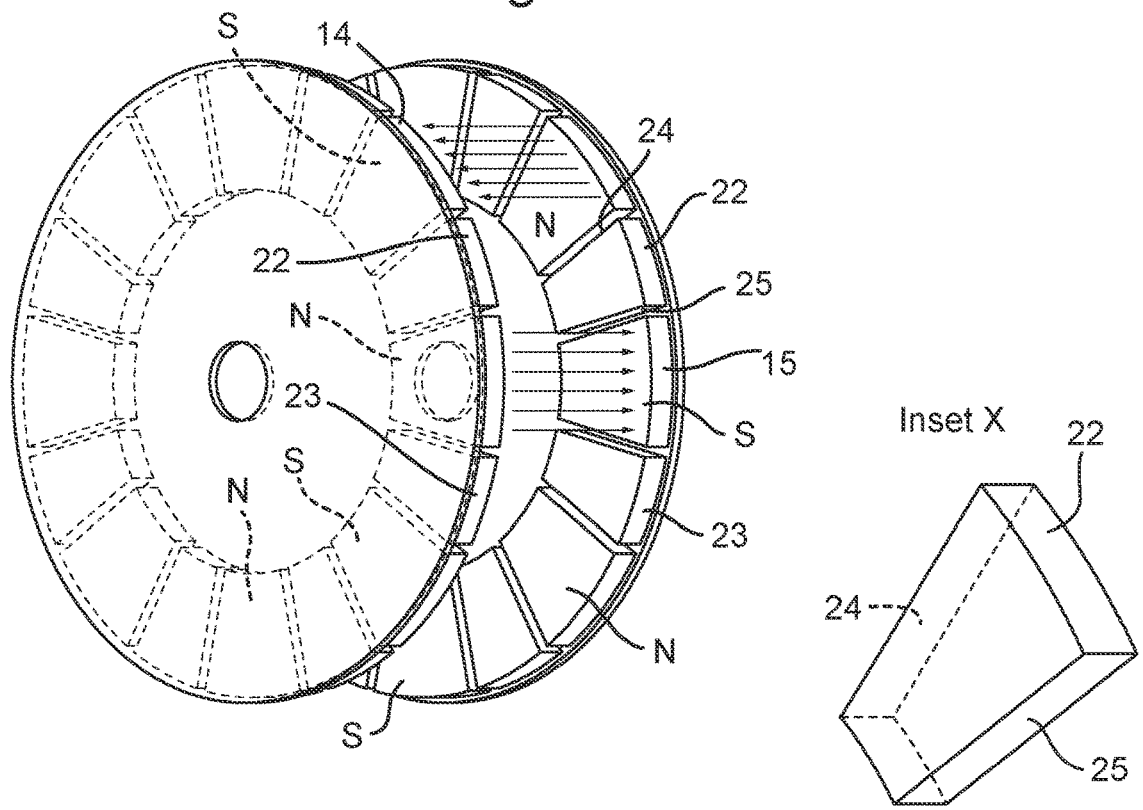
Inset X
Inset Y
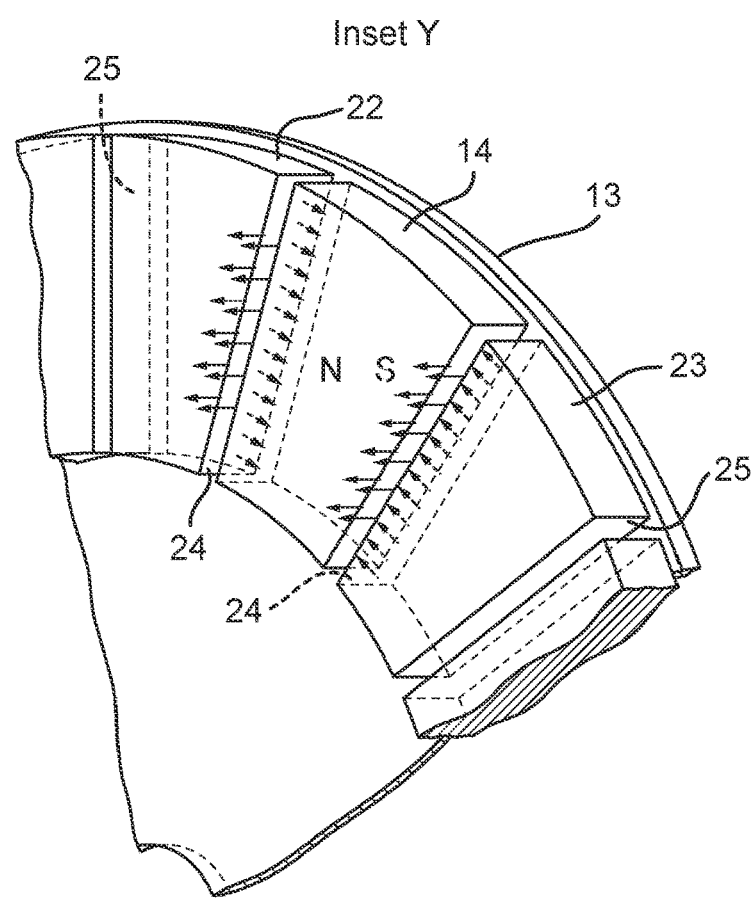

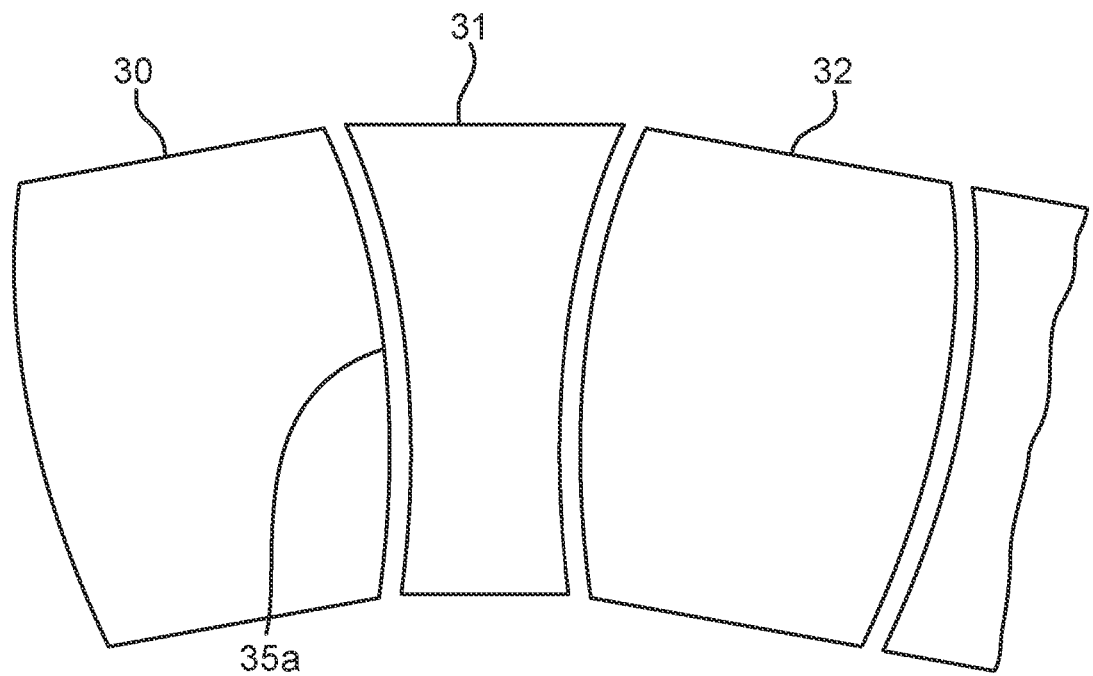

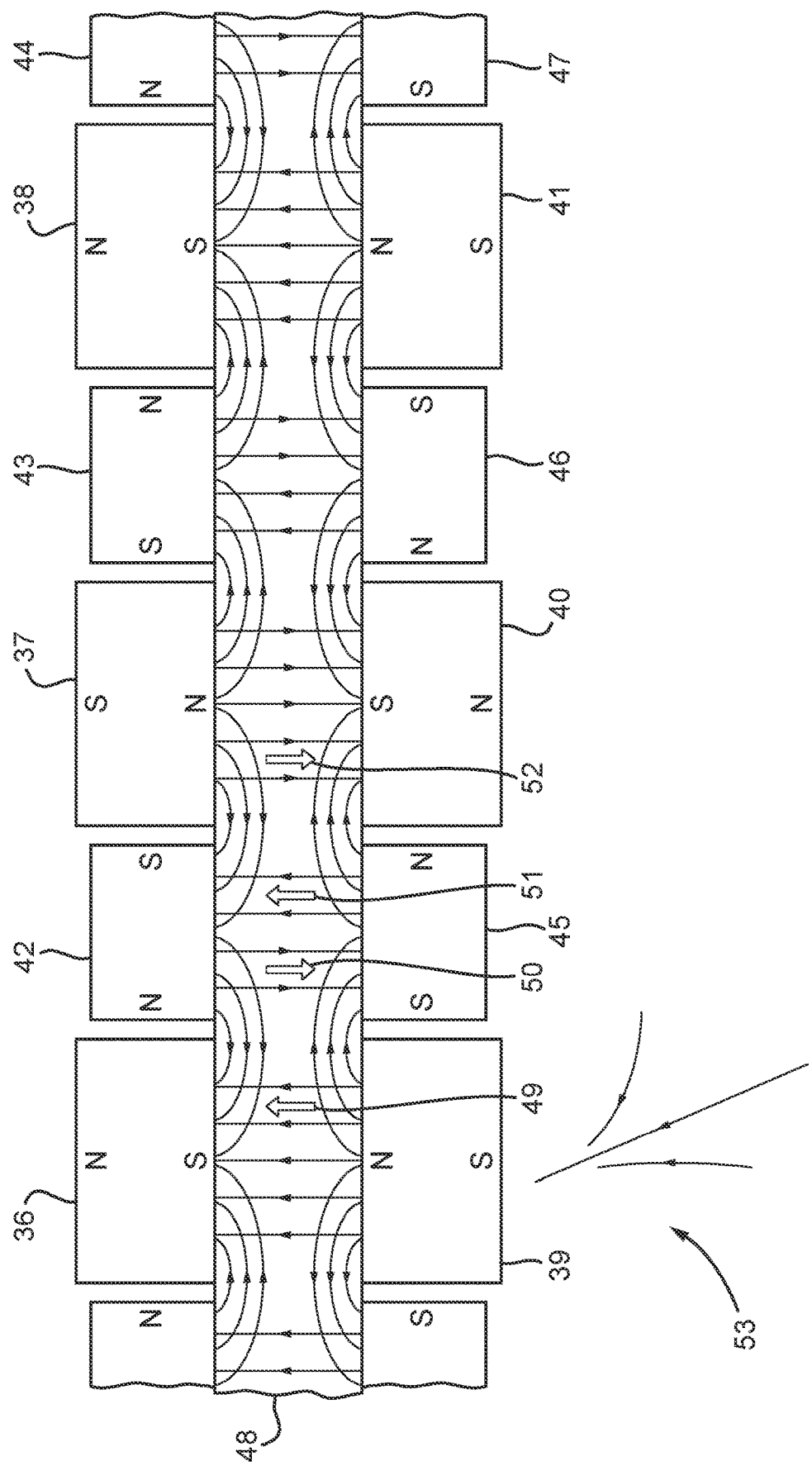

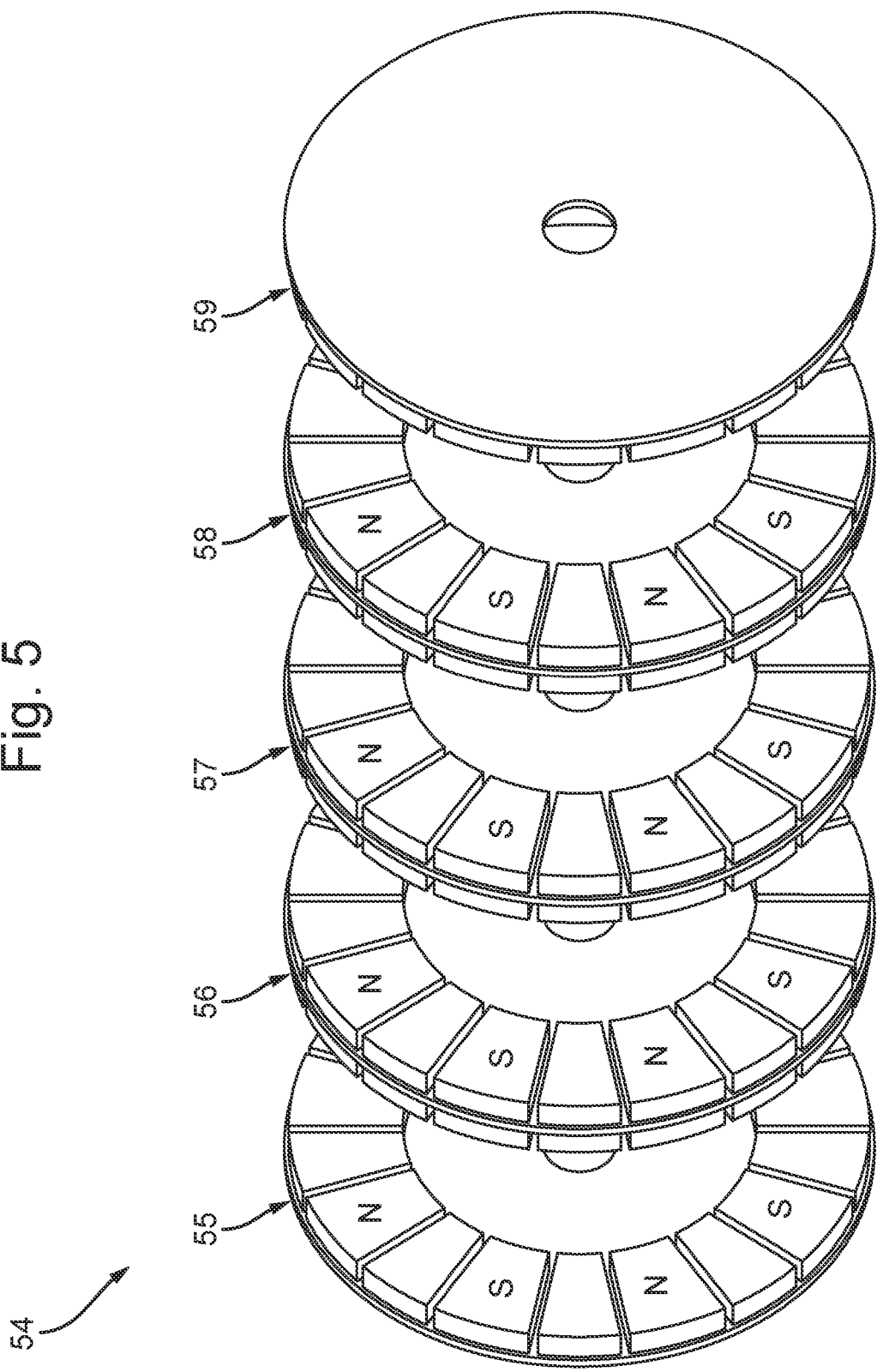

Fig. 6
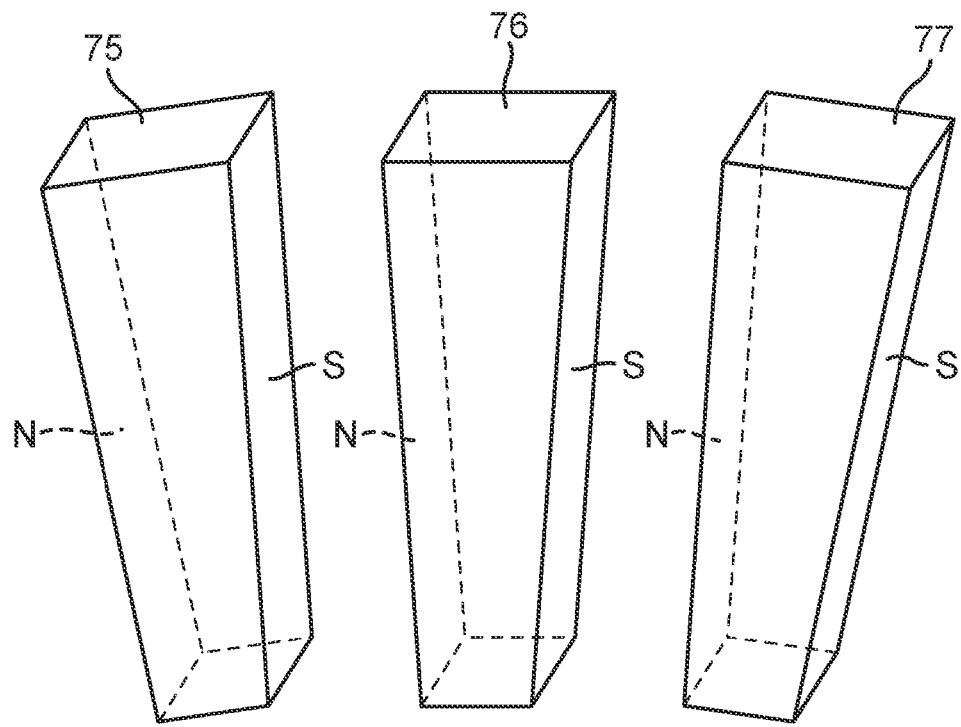
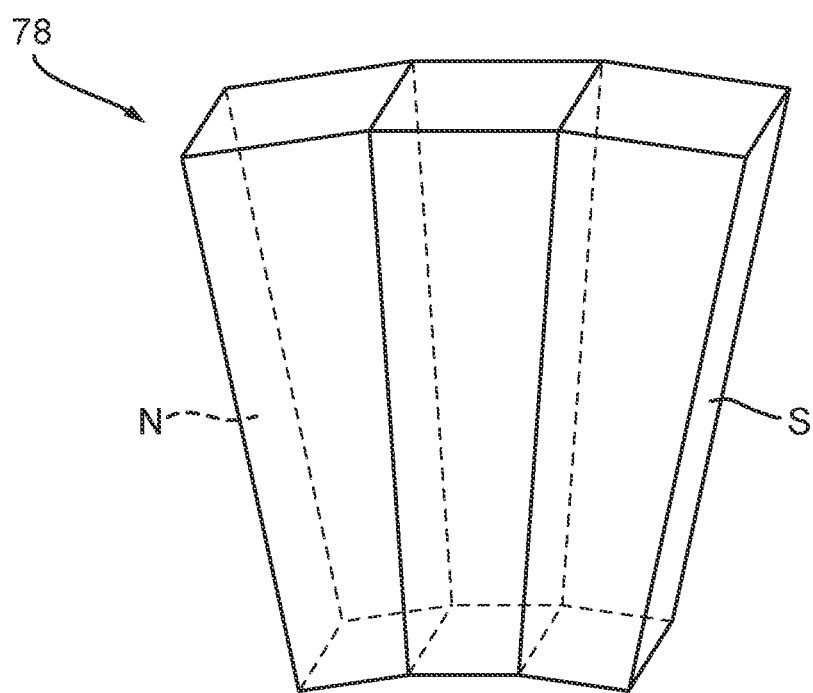

ROTOR FOR PERMANENT MAGNET GENERATOR

The following invention relates to rotary electrical generators of the type known as permanent magnet generators. In these, permanent magnets are used within the rotor of the generator to provide magnetic fields for cutting the turns of coils embedded within its stator so generating electrical power. In particular, the invention relates to a form of axial flux permanent magnet generator as disclosed in co-pending application no. GB 1 320 623.0.

In the generator of this co-pending application, its rotor comprises at least one magnetic annulus pair, having a gap therebetween and having a sequence of spaced permanent magnets around each annulus with alternating north and south poles facing the gap between them, corresponding permanent magnets of the first and second annuli of a magnetic annulus pair having unlike poles facing the gap and facing each other across the gap such that lines of magnetic flux extend across the gap between the corresponding permanent magnets. Its stator, interposed in the air gap between the magnetic rotor annuli, comprises a coil annulus formed of a circumferential sequence of coils. The stator and rotor annuli share a common axis, such that rotation of the rotor relative to the stator causes the induction of electro-motive forces (emfs) within the coils of the stator.

In such a form of permanent magnet generator, it is evident from an appreciation of Fleming's right hand rule that the emf induced in the stator coils is directly dependent upon the density of the magnetic flux extending across the air gap between the facing magnets. However, in a generator of the design disclosed in the aforesaid co-pending application, the density of this flux tends to be at its most concentrated between the central regions of the facing magnets, and diminishes noticeably towards their peripheries. This is disadvantageous inasmuch that ideally the flux cutting the stator coils should be as concentrated as possible over the whole of the spacial volumes between the facing magnets, in order to maximize the induced emf.

To augment the density of flux emanating from laterally spaced magnets of opposite polarity, arrangements are known in which first and second parallel typically bar form magnets, spacially separated from one another and magnetized conventionally across their front and rear faces and having opposite polarities facing outwards, sandwich a further bar magnet positioned magnetically sideways relative to the first and second magnets. The effect is to augment the magnetic field emanating from one face of the three bar combination, while substantially reducing, or even eliminating the field emanating from the opposite face. A typical use of such a combination, sometimes referred to as a Halbach or Mallinson array, is in fridge magnets where it is desirable for a strong field to be prevalent on one side only. However, for reasons to be disclosed hereinafter the magnetic geometries of these types of arrangements are not optimal for the type of generator disclosed in the aforementioned co-pending application, of this application.

According to a first aspect of the invention there is provided a rotary generator comprising:

at least one magnetic annulus pair comprising a first magnetic annulus and a second magnetic annulus with a gap therebetween; a coil annulus in the gap; the first and second magnetic annuli and the coil annulus having a common axis; the first and second magnetic annuli of the at least one magnetic annulus pair each having: a sequence of principle permanent magnets spaced around the common axis with alternating north and south poles facing the gap, corresponding principle permanent magnets of the first and second magnetic annuli of a magnetic annulus pair, with unlike poles facing the gap, facing each other across the gap such that lines of magnetic flux cross the gap between the corresponding principle permanent magnets, and a sequence of intermediate permanent magnets, each of the intermediate permanent magnets being positioned between two of the principle permanent magnets, each intermediate permanent magnet having adjacent the gap a north pole facing a side of the principle permanent magnet of the two principle permanent magnets having a north pole facing the gap and each intermediate permanent magnet having adjacent the gap a south pole facing a side of the principle permanent magnet of the two principle permanent magnets with a south pole facing the gap, the coil annulus having a sequence of coils arranged around the common axis such that the lines of magnetic flux cut the turns of the coils and thus induce electric currents in the coils as the magnetic annuli are caused to rotate relative to the coil annulus.

According to a second aspect of the invention there is provided a rotary generator comprising:

at least one magnetic annulus pair comprising a first magnetic annulus and a second magnetic annulus with a gap therebetween; a coil annulus in the gap; the first and second magnetic annuli and the coil annulus having a common axis; the first and second magnetic annuli of the at least one magnetic annulus pair each having: a sequence of principle permanent magnets spaced around the common axis with alternating north and south poles facing the gap, corresponding principle permanent magnets of the first and second magnetic annuli of a magnetic annulus pair, with unlike poles facing the gap, facing each other across the gap such that lines of magnetic flux cross the gap between the corresponding principle permanent magnets, and a sequence of intermediate permanent magnets, each of the intermediate permanent magnets being positioned between two of the principle permanent magnets, each intermediate permanent magnet having adjacent the gap a north pole facing a side of the principle permanent magnet of the two principle permanent magnets having a north pole facing the gap and each intermediate permanent magnet having adjacent the gap a south pole facing a side of the principle permanent magnet of the two principle permanent magnets with a south pole facing the gap, the coil annulus having a sequence of coils arranged around the common axis such that the lines of magnetic flux cut the turns of the coils and thus induce electric currents in the coils as the magnetic annuli are caused to rotate relative to the coil annulus, wherein the first and second magnetic annuli of the at least one magnetic annulus pair each further comprise a backing plate of ferromagnetic material, the principle permanent magnets being positioned between the backing plate and the gap and mounted to the backing plate such that adjacent principle permanent magnets are magnetically coupled to one another through the backing plate.

The presence of the intermediate permanent magnets, hereinafter referred to for convenience as interpoles, renders impossible the leakage of flux flowing laterally across the gaps previously present between the sides of the principal permanent magnets, as well as favourably shaping and focusing the flux across the gap between facing principal magnets.

In the aforementioned co-pending patent application, an arrangement is disclosed in which its permanent magnets (equating to the principle permanent magnets of the generator of this invention) are mounted upon a ferromagnetic backing plate. The effect of this is to reduce lateral flux leakage between the sides of the magnets by enhancing the magnetic coupling between their rear faces, thus augmenting in turn the density of flux crossing the airgap of that form of generator.

The presence of the backing plate of the present invention is to facilitate not only the coupling between the rear faces of the principle magnets, but also to facilitate the coupling of the inner poles of the intermediate permanent magnets to the inner poles of the principle permanent magnets. This is desirable. From the foregoing, it will be appreciated that the edges of any interpole are in repulsion to the outer faces of the principle permanent magnets sandwiching them. It is this effect, in accordance with the present invention, that focuses and increases flux density across the air gap.

However, as will be appreciated from consideration of this arrangement, the sides of the interpoles are each in repulsion to the front faces of the principal magnets sandwiching them. Any arrangement of permanent magnets in which like poles are physically adjacent is not conducive to magnetic resilience, that is to say resistance to demagnetization. (This may occur for example through the presence of extraneous opposing magnetic fields such as may arise from armature reactance). However, with the benefit of the presence of the ferromagnetic annulus, hereinafter referred to as backing iron, because the magnetic poles adjacent the backing plate of both the principle permanent magnets and the interpoles are each coupled in actual magnetic attraction through the backing plate, the working point of each of the principle permanent magnets and the interpoles is improved, thus providing protection to a material extent against the effects of any such demagnetizing fields. The backing plate may be considered in old technical parlance as a keeper. Preferably the backing plate is at least 4 mm thick, ideally 6 mm or more, and can be fabricated from soft iron materials, or specialist compounds such as anisotropic silicon steel, mu-metal and permalloy. A backing plate fabricated from soft iron at least 6 mm thick has adequate permeability to provide the desired magnetic coupling between the principal and intermediate magnets mounted upon it.

As well as assisting the working point of the magnets, practical experimentation shows that the presence of the backing iron plate can augment average flux density at the faces of the magnets facing the air gap, by as much as 31% compared to the case where there is no ferromagnetic backing plate.

While the arrangement of the invention superficially resembles the aforementioned Halbach array, this is not the case magnetically or physically. In an aspect the magnetic annuli are not in a Halbach array. This is because magnetic flux extends out of both sides (poles) of the principle permanent magnets and into the backing plate. This is achieved by the relative sizing of the principle and intermediate magnets, for example the principle permanent magnets are much wider than the intermediate permanent magnets. In accordance with an aspect of this invention, the permanent magnets used within the rotors of the generator are of the type known as ferrite. Ferrite magnets provide appreciably weaker magnetic fields than rare earth magnets as are more commonly used in generators or electric motors. On account of this factor, wide area magnets and correspondingly large configuration stator coils of many turns can be used to generate worthwhile electromagnetic forces as relative motion occurs between the two. By use of such wide area magnets, and in contrast to classic Halbach arrangements, appreciable magnetic fields are certainly present and emanating from the rear faces of the two sequences of magnets. Indeed, magnetic field measurements show that the average flux intensity across the rear faces of the magnets to be as high as 60% of that present at the front surface (gap side) of the magnets. This is a substantial proportion of the strength of the flux at the gap side of the magnets.

(Note: a definition of an array known as a Halbach array, is: "A Halbach array is a special arrangement of permanent magnets that augments the magnetic field on one side of the array while cancelling the field to near zero on the other side. This is achieved by having a spatially rotating pattern of magnetization".)

In contrast to classic Halbach arrangements, backing iron is provided. The presence of the backing iron significantly increases the flux density emanating from the principle permanent magnets towards the gap. This again is in contrast to traditional prior art arrangements, such as is disclosed in USA US2013002066 (A1) where an electric motor utilizes an actual Halbach array and minimal magnetic leakage results from the rear face of the assembly, and no back iron is used. The same pertains to CN102904404 (A) which in utilizing a traditional Halbach array specifically mentions that the Halbach arrangement forms its own closed circuit with no backing iron and CN 104167893, again using a Halbach array with an ironless rotor.

A further and significant advantage arising from the addition of the backing plate ferromagnetic annulus is its effect in increasing flux intensity at the magnet surfaces facing the gap between the rotors. In the arrangement of the present invention, practical experimentation shows as aforesaid that the presence of back iron of sufficient thickness and thus permeability, can augment average flux density over the principal magnet surfaces by over 31%.

Thus the arrangement of the present invention provides novel means both for preventing lateral flux leakage between the sides of the principal magnets, as well as improving the working point of the ferrite magnets mounted upon the rotor. This is especially important in the case of ferrite based machines, as, unlike machines utilizing rare earth magnets, ferrite magnets are vulnerable to demagnetization from extraneous magnetic fields. Furthermore, the focusing, the magnetic field strength and shaping of flux between facing principle magnets is improved.

In terms of measurable benefits, the overall increase in magnetic performance resulting from these arrangements can be substantial, for example in excess of 20%, so directly resulting in a corresponding increase in the emfs generated within the stator coils. As generator output power into a given load is proportional to the square of the emfs induced in its coils, it can be seen than a 20% increase in emf results in a 44% increase ($1.2^2$) in the power generated. The one-off cost of the additional material required to construct the interpoles is quickly dwarfed by the commercial value of the electricity generated over the lifetime of the generator.

According to an aspect of the invention, for a given size generator the ratio of the widths of the principle permanent and the intermediate permanent magnets together with the selection of the average width of the active portion of the layers of the stator coils used to generate emfs are each so determined such that the increase in the emfs generated in the coils is increased by at least 20% were there to be no interpoles present.

It is customary for permanent magnets used in generators of this type to be in the form of square or rectangular blocks in which their width and length exceeds by several factors their thickness. The north and south magnetic poles are opposite one another and are the front and back faces (i.e. the faces defined by the width and length) of the block.

Modern production techniques readily allow however for any reasonable geometric shape of magnet to be sintered during production to suit the specific application in which they are to be used. Variations in the shapes of magnets e.g. having other than strictly orthogonal geometries can benefit the flux densities provided by them, as well as other characteristics such as their resistance to magnetization by external opposing fields.

According to a feature of this invention, at least one of the sets of opposite sides extending in the radial direction of the principle permanent magnets and the intermediate permanent magnets sandwiched by them, are curved (e.g. convex or concave) in such manner as to augment the flux densities provided by them and crossing the airgap of the generator. In an embodiment of this feature, in which sides of both the principle permanent magnets and the intermediate permanent magnets are curved, the curves of each may be complementary such that the one can nestle into the other.

In a first implementation of this feature, the sides of the principle permanent magnets are concave. In a second implementation of this feature, the said sides are convex.

In some instances, it may not be either practical or desirable for the sides of the principle permanent magnets and the interpoles to be physically adjacent. This can be on account of manufacturing costs, the shaping of the flux issuing from them or ensuring stability against demagnetization. In this case, it can be advantageous to introduce ferromagnetic pole piece inserts of ferromagnetic material positioned between the interpoles and the principle permanent magnets.

In order to use interpoles to the greatest advantage, their design should take into account the geometry of the stator coils and vice versa. This is again in order to optimize the emf generated within the turns of the coils as they are swept by the flux provided by the combination of the principle permanent magnets and interpoles. In particular, for certain elongated shapes of principle permanent magnets, theoretical analysis indicates that an increased emf can result from the use of near square or elliptical coils. However the effect can be increased further by also adapting the dimensions of the interpoles relative to those of the principle permanent magnets.

According to a feature of the invention, the intermediate permanent magnets extend in length radially inwardly closer to the common axis than the principle permanent magnets and/or extend radially outwardly further from the common axis than the principle permanent magnets.

The effect of this variation is to provide a longer radial length of flux density to cut the turns of stator coils traversed by the magnets of the rotor, and thereby to effect a corresponding increase in the emf generated within the stator coils.

This aspect of modifying the design of the interpoles need not be confined solely to variations in their lateral side dimensions.

According to a further feature, the interpoles have a thickness in an axial direction of the rotary generator which is less than a thickness in the axial thickness of the principle permanent magnets such that the corresponding principle permanent magnets are closer together than the distance between the intermediate permanent magnets of the first annulus and intermediate permanent magnets of the facing second magnetic annulus.

Experimentation reveals that in this arrangement, in which the interpoles are in effect shallower than the principle permanent magnets on either side of them, a more even and thus favourable distribution of magnetic flux is achieved across the surface of the principle permanent magnets. Resulting from this, the emf generated within the stator coils is further augmented.

In the aforementioned co-pending application, in one specific embodiment, the rotor of the generator disclosed therein comprises, rather than a number of discrete pairs of magnetic annuli, a stack of magnetic annuli. Air gaps for stator coils are present between each of them. In this case, the first two annuli in the stack define a first airgap, and the rear face of the second magnetic annulus is populated with magnets in the same manner as its front face to face the front face of a third magnetic annulus to form a second airgap, and so forth along the whole length of the stack.

The same arrangement may be constructed using the rotors of the present invention.

In this case, each rotor comprises a central backing plate annulus, and each side of the plate, other than the very end plates, is populated with sequences of principal and interpole permanent magnets of alternating polarity again as aforesaid to form the continuous sequence of magnetic annuli along the length of the rotor. That is to say airgaps are formed in between the rings of magnets mounted on either side of each backing iron plate. In other words both principal magnets and interpole magnets may be mounted in the manner described upon each side of the backing plate, thus to create a sequence of enhanced strength flux air gaps along the full length of the generator In the case of larger generators constructed in accordance with the present invention and having significant generating power capacity, for example hundreds or thousands of kilowatts, the rotors thereof may have significant diameters. These can be for example three to six meters. In this case, for reasons of electromagnetic efficiency, the principal permanent magnets are made commensurately large, having widths, for example, of up to third of a meter or more. This is feasible in practice, as the designated size can be achieved simply by conjoining side by side a number of standard size smaller magnets (a popular size being: length 0.15×width 0.10×thickness 0.025 m), all of which are magnetized across their width to produce the single large face having one polarity.

The above method may be difficult to achieve for the interpoles. Due to manufacturing constraints, it can be difficult to magnetise across its opposite edges a single piece interpole magnet being of the same scale or close to that of the principal permanent magnets sandwiching it. In fact, the maximum which can be accommodated may only be in the region of one inch (2.5 cm).

According to a further feature of the invention, more substantial interpoles may be constructed from a stack of laterally conjoined narrower magnets each magnetized across their opposite edges and in attraction to its neighbour in such manner to provide a single interpole magnet of the desired overall width.

The invention will now be described by way of example only with reference to the accompanying drawings in which:

FIG. 1a shows two facing magnetic annuli equipped solely with principle permanent magnets and FIG. 1b shows two facing magnetic annuli equipped with both principle permanent magnets and the intermediate permanent magnets of the invention.

FIGS. 3 a, b and c show variations in the dimensions of the interpoles, and the corresponding effects on magnetic flux density.

FIG. 4 shows interpoles mounted upon a ferromagnetic backing plate, and the magnetic couplings between adjacent poles.

FIG. 5 shows a stack of magnetic annuli equipped with both principle permanent magnets and interpoles.

FIG. 6 shows a method of constructing larger width interpoles.

Figure 7:
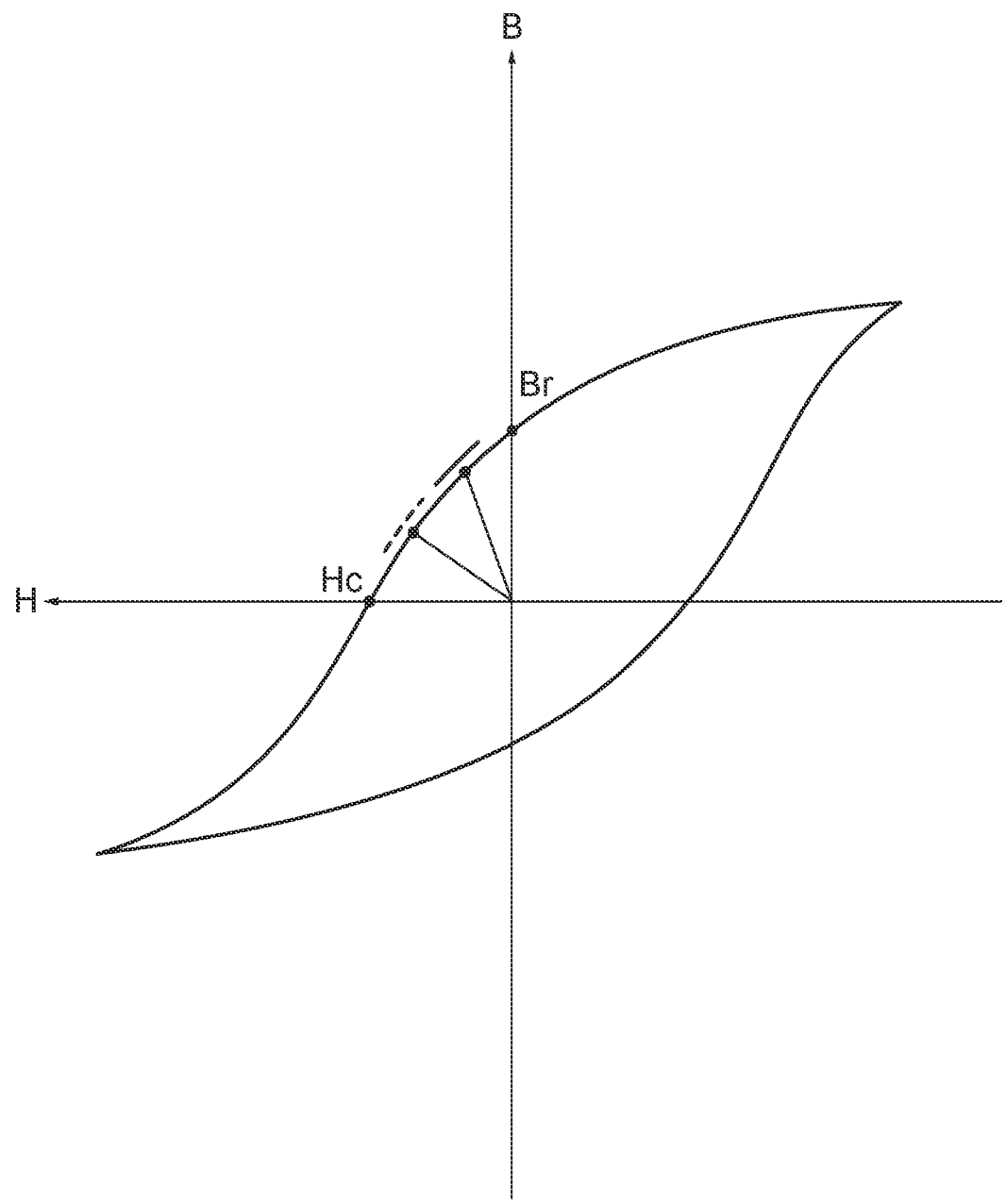

FIG. 7 shows a hysteresis loop.

Figure 1C:
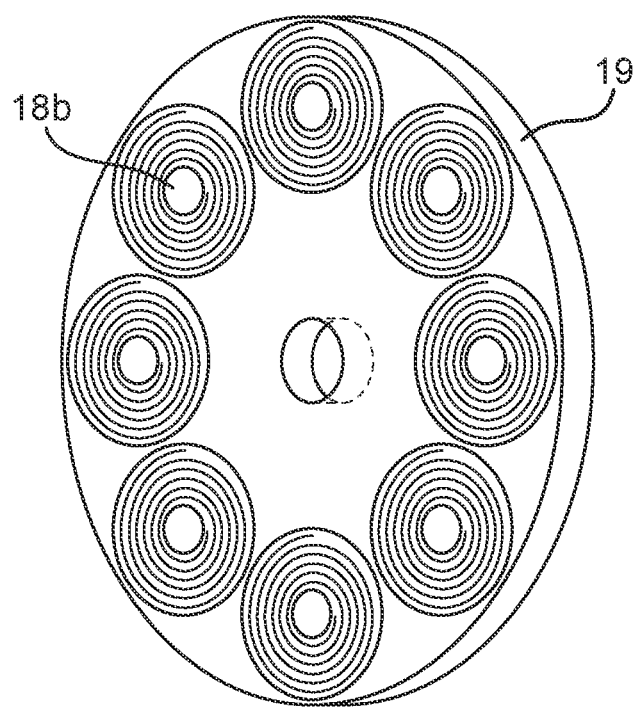
FIG. 1c shows a stator (coil annulus) for use with either arrangement in FIGS. 1a and 1b.

Referring to FIG. 1a, two magnetic annuli of a rotor of the present invention are shown at 10 and 11, but without the addition of the intermediate permanent magnets (interpoles). They each comprise ferromagnetic backing plates 12 and 13 upon which are mounted a circumferential sequence of spaced permanent magnets 14 and 15. These permanent magnets, referred to herein as principle permanent magnets, alternate in polarity as shown. The angular positions of the two annuli are displaced relative to one another by one pole pitch such that opposite poles face one another as indicated across the air gap 16. A side view of the arrangement is shown for clarity at 16b.

Streams of magnetic flux of alternating polarity thus cross the air gap between the facing principle permanent magnets 13, 14, as shown at 17, 18 and so on. These streams of flux are used to cut the turns of a stator coil annulus 19 bearing a circumferential sequence of coils 18b and placed within the air gap 16 and sharing a common axis of rotation with the magnetic annuli 11, 12, here shown for clarity away from the annuli in FIG. 1c. Rotation in use of the magnetic annuli relative to the coil annulus 19 results—in well known manner—in the induction of electromagnetic forces within the stator coils 18b.

In accordance with Fleming's Right Hand Rule, the greater the concentration of flux density cutting the coils 18b, the greater the emf induced within them. An example of a typical distribution of flux density between the poles of facing magnets is shown 'face on' at 20. The darker areas depict stronger flux densities and conversely, lighter areas, weaker flux densities. It can be readily seen that the density of the flux degrades noticeably from the center of the rectangular block towards its corners and edges. This is disadvantageous in terms of the emf which is generated. Clearly only the more central turns of a coil annulus coil 18b, as shown in outline at 21, enjoy the densest flux as this passes over coil's central region, whereas the upper and lower layers benefit less.

The introduction of the interpoles disclosed in this application, mounted upon a backing iron annulus, radically changes this situation.

This is now illustrated with reference to FIG. 1b. In this, the rotor annuli carry both principle permanent magnets 14 and 15, here shown as rectangular blocks, as well as trapezoidal intermediate permanent magnets (interpoles) 22 and 23 sandwiched between them. The interpoles 14, 15 are magnetized in a special manner, unlike that normally associated with flat face permanent magnets. Rather than being magnetized in the conventional sense, i.e. across their thickness, they are instead magnetized laterally. That is to say, across their widths. Thus the whole length of one side 24 of the interpole 22, 23 is magnetized e.g. North, and the whole length of its opposite side 25 is magnetized South. For clarity, see also the inset at X.

The essence of the present invention is as follows. The insertion of an interpole 22, 23 such that its entire side polarity (or at least the polarity adjacent the gap 16) is in repulsion with the polarity of the outwardly facing face (the face pointing towards the gap 16) of the principle permanent magnet 14, 15 it is placed against, renders impossible the previous lateral leakage of flux between the side faces of neighbouring principle magnets, 14 and 15. Furthermore, it causes a significant increase and focusing of the lines of magnetic flux streaming across the airgap 16. It even enhances the density of flux emanating from the central regions of the principal permanent magnets 14, 15.

In summary, each intermediate permanent magnet has a north pole facing the principle permanent magnet of the two principle permanent magnets with a north pole facing the gap and each intermediate permanent magnet having a south pole facing the principle permanent magnet of the two principle permanent magnets with a south pole facing the gap.

Although a first consideration of the foregoing arrangement might lead to the conclusion that the presence of the repelling interpole 22, 23 is wholly unfavourable (in terms of magnetic stability) to the principle permanent magnets 14, 15 on either side of it, this is not the case. The full magnetized side 24, 25 of the interpole 22, 23, while repelling the lines of force issuing from the front face of the principle permanent magnets 14, 15, is of course in attraction to the rear face of the same principle permanent magnet 14, 15, as this polarity is of course opposite to that of its front face. Thus the net effect on the principal permanent magnet is reduced. This is shown at a larger scale at the inset Y of FIG. 1b. The sides 24 of the interpoles 22 and 23—adjacent to the principal permanent magnet 14—are magnetized North, and thus are in repulsion to its front face. This bolsters the lines of flux issuing from the said front face and crossing the air gap 16. However, the same side faces 24 of the interpoles are also favourably in attraction to the South inward facing face of principle permanent magnet 14.

The presence of the interpole 22, 23 both prevents lateral flux leakage across the gap between the edges of the principal permanent magnets as well as enhancing the magnetic fields crossing the airgap 16 of the generator, while not significantly detracting from the magnetic stability of any of the rotor principle permanent magnets 14, 15. Thus the generator can be made using ferrite magnets instead of rare earth magnets because of the enhancement of the magnetic field, and thus the generation of worthwhile emfs.

Figure 2:
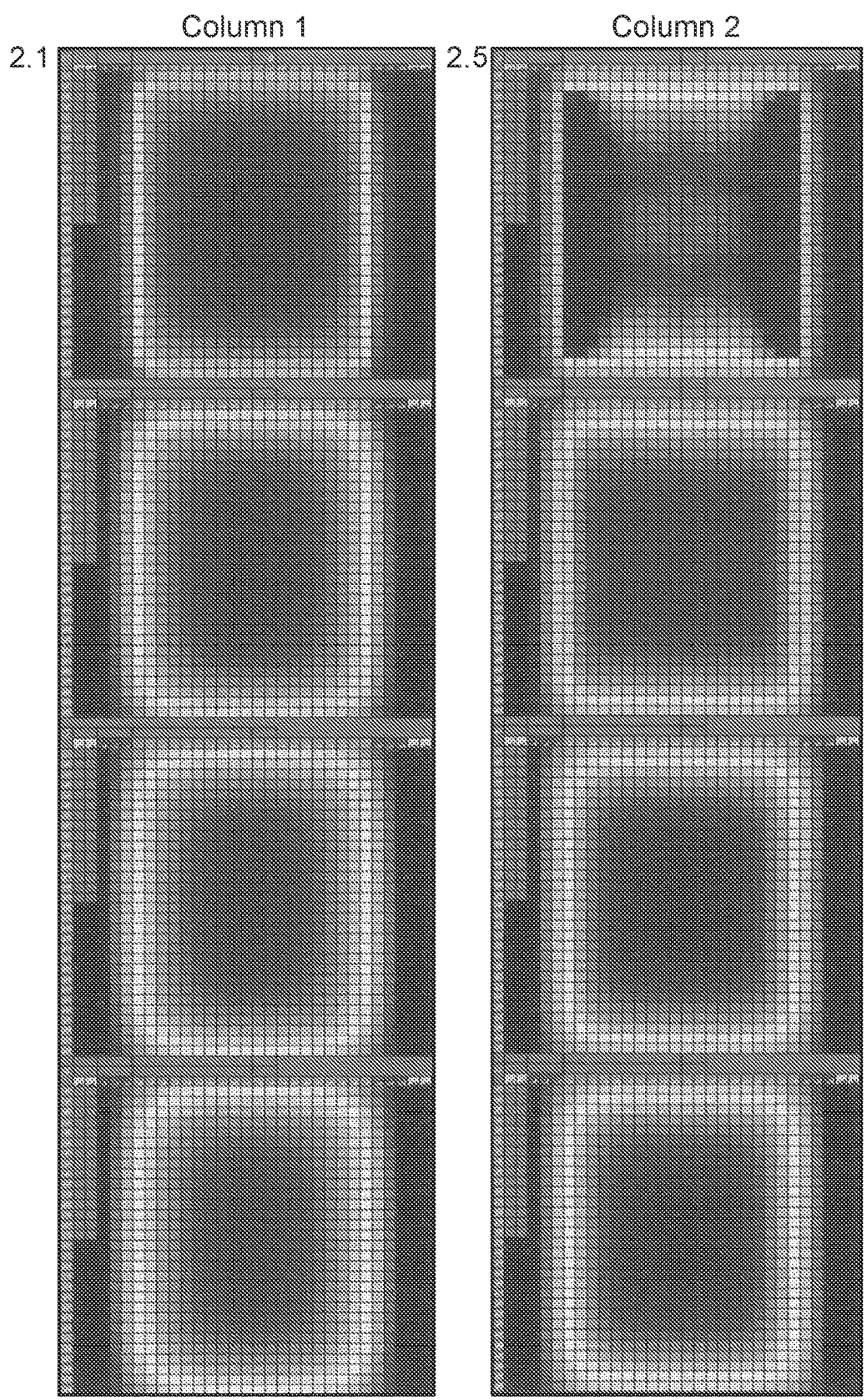
FIG. 2 shows printouts of actual flux intensities as provided by the arrangements shown in FIGS. 1a and 1b.

An actual example of the efficacy of this arrangement, taken from 3D measurements of magnetic field intensities between principle permanent magnets of facing rotor annuli, is shown at FIG. 2. Column 1 shows four magnetic slices, taken evenly across half of a given airgap. (The top image is that of the flux pattern adjacent to the magnet, and the bottom image is that halfway across the air gap 16.) Column 2 shows again the same magnetic slices, but with the presence of interpoles. In this case, the top image shows a marked contrast compared to the same top image in column 1, and the increase in overall 'blackness'—indicating flux intensity—is maintained down all the slices.

The practical effect is an average increase of 18 to 20% in flux density, borne out both by physical measurements (as indeed used to create the images of FIG. 2) and as independently calculated by finite element analysis. The commensurate increase in emf generated within the coils of the stator is therefore also 18-20%. This is a significant increase, as power generated is proportional to the square of the induced voltage. Thus an increase in emf of 20% results in an increase in power of 44% ($1.2^2$). In practical terms, this would mean that the 10 MW output e.g. of a large scale off-shore wind turbine, would be increased to 14.4 MW. The cost of the additional magnetic material used to form the interpoles is dwarfed in a very short time by the commercial returns on the extra electricity generated.

Examples of how the benefits arising from the use of interpoles can be further optimized, are now given with reference to FIG. 3.

In the case of any permanent magnet, the pattern and density of the lines of force issuing from it are governed by the magnet geometry. Taking for example a simple rectangular block magnet, the density of flux per unit area issuing from either of its pole faces is far from even and falls away appreciably in certain locations, for example away its very middle. The mechanism by which this occurs is complex, but the field distribution can be modeled accurately by finite element analysis techniques. In the case of the rotor of the present invention, the objective is simply to augment to the maximum extent possible the density of lines of force crossing the air gap between magnetic annuli.

Figure 3A:
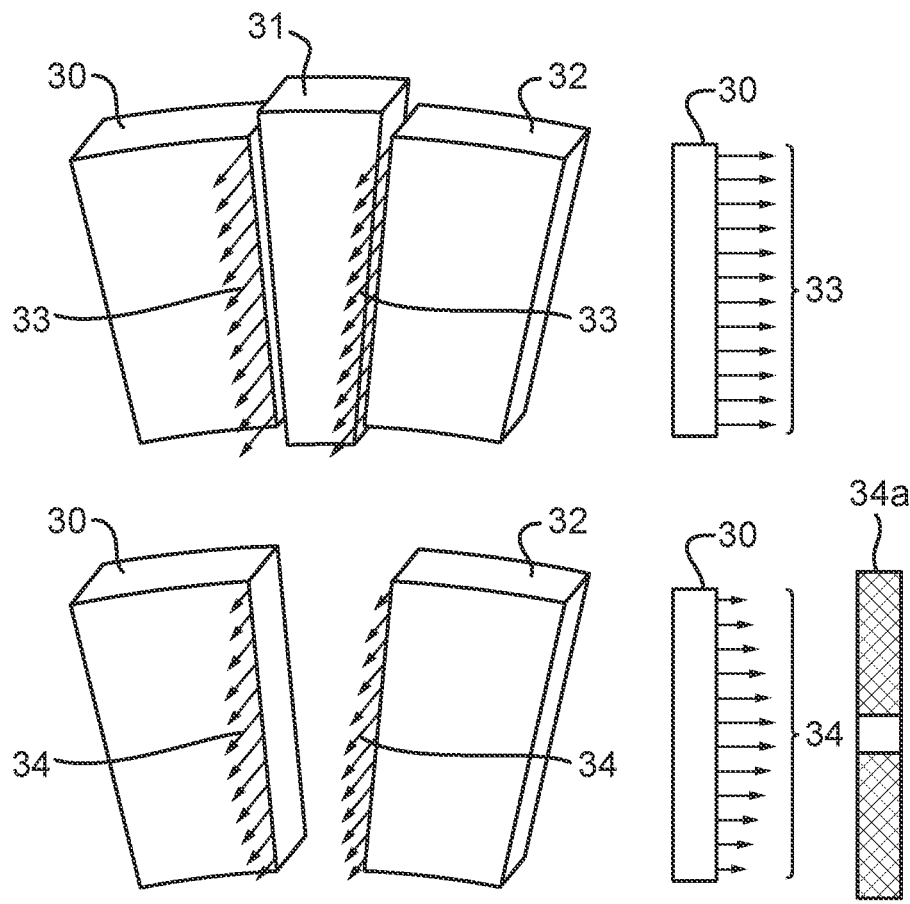

To this end it is found that it can be advantageous for an interpole 31 to be longer along its radial length that the principal permanent magnet 30, 32 against which it is located. That is, the intermediate permanent magnets extend in length radially inwardly closer to the common axis than the principle permanent magnets and/or the intermediate permanent magnets extend radially outwardly further from the common axis than the principle permanent magnets. This is shown at FIG. 3a. Two principle permanent magnets 30 and 32 sandwich an interpole 31. The interpole 31 is shown longer than its neighbouring principle permanent magnets 30, 32. The result is to tend to maintain more evenly concentrated the lines of force issuing from along the full length of the principle permanent magnets 30, 32, as indicated at 33. Were the interpole 31 to be of the same length, there would be a tendency for the strength of flux lines to diminish near the top and bottom of the principle permanent magnets 30, 32. Without the presence or any interpole 31, a pattern such as that shown at 34 results, clearly disadvantageous in terms of cutting the turns of a larger diameter coil—as shown at 34a—and thus the optimized generation of emfs.

Figure 3B:
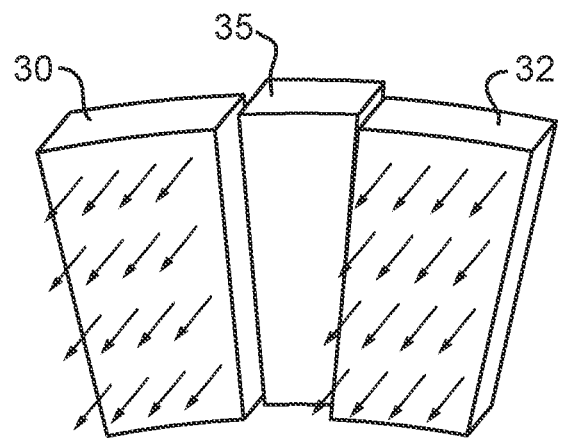

A further aspect of optimizing flux density concerns the thickness of the interpole 35 relative to its neighbours. This is shown in FIG. 3b in which the principle permanent magnets 30 and 32 sandwich the interpole 35. By rebating the front face of the interpole 35, a more even distribution of flux issues from the magnets 30 and 32, again of benefit to the performance of the generator. Thus, there is a benefit in arranging for the intermediate permanent magnets to have a length in an axial direction of the rotary generator which is less than a length in the axial direction of the principle permanent magnets such that the corresponding principle permanent magnets are closer together than the distance between intermediate permanent magnets of the first magnetic annulus and intermediate permanent magnets of the second magnetic annulus.

Yet a further optimization can be achieved by addressing the profile of the sides of the principle permanent magnets and interpoles. It is feasible, using modern manufacturing techniques, to sinter magnets to desired curved profiles. An example of this is given with reference to FIG. 3c. Two principle permanent magnets s are shown at 30 and 32, with convex curved sides, such that each principle permanent magnets 30, 32 is wider across its middle section. The interpole 31 nestling between them is conversely curved concavely. The augmentation of magnetic material across the middle of principle permanent magnets 30 and 32, coupled to the improvement in field strength arising from the presence of the interpole 31, results in a substantial increase in flux density issuing from the central band of the principle permanent magnets 30, 32, for cutting the near vertical side portion of a stator coil, so further benefiting the emf generated. In an embodiment the sides may be curved in other shapes, for example to ease manufacture or assembly or to influence the magnetic field. The principle permanent magnets may have concave sides and the interpoles convex sides.

The curves of the principle permanent magnets and the intermediate permanent magnets may be complementary such that the one can nestle into the other. This ensures all space is used efficiently in achieving the desired magnetic field.

In practice, combinations of the variations shown in FIGS. 3a, b and c, can be investigated for any particular size generator to establish the optimum geometries.

In some instances, it may not be either practical or desirable for the sides of the principle permanent magnets and the interpoles to be physically adjacent. This can be on account of manufacturing costs, the shaping of the flux issuing from them or ensuring stability against demagnetization. In this case, it can be advantageous to introduce ferromagnetic pole piece inserts of ferromagnetic material positioned between the interpoles and the principle permanent magnets.

Referring to FIG. 4, a detailed schematic is given of the various magnets comprising a magnetic annulus rotor, and how their fields are advantageously coupled when mounted, in accordance with the present invention, on either side of a ferromagnetic backing plate, 48, referred to herein as a backing iron plate. (Note, the plate thickness is not shown to scale, but has been shown enlarged for clarity).

Principle permanent magnets are shown at 36 to 41 and these sandwich interpoles 42 to 47. The magnetic vectors coupling the fields issuing from the magnets are shown as arrowed lighter lines within the backing plate 48. It can be seen that they all advantageously add together as shown at a larger scale at 53, to form the thicker vectors 49 to 52, and so on around the circumference of the backing plate 48. This positive coupling at the rear of the magnet faces further enhances the densities of flux issuing from the front faces of the principle permanent magnets, as well as helping to ensure—as aforesaid—the magnetic stability of the principle permanent magnets.

To achieve adequate flux densities and thus the generation of sufficient emfs, both the main and interpole magnets are of wide dimensions, as shown in FIGS. 1b and 5. This affords a wide flux distribution for cutting the turns of a commensurately wide multi turn stator coil. In this case, noticeable flux is present and emanates from the rear faces of the two sequences of magnets.

The presence of the backing plate improves the working point at which the magnets operate. This is of especial importance for the generator of the invention if ferrite magnets are used. These can be vulnerable to demagnetization by external fields, such as can arise from armature reactance. Thus, any improvement possible in completion of magnetic circuit, reduces the likelihood of this occurrence. An example of an improved working point is shown in the hysteresis loop of FIG. 7, where the original working point area as designated by the dotted line, is elevated to the solid line, thus removing the magnet from the danger area represented by a demagnestising field exceeding Hc.

A generator of any desired output can be constructed from an extended stack of rotors. This is shown at 54 in FIG. 5. Five annuli are shown at 55 to 59, and carry on their faces principle permanent magnets and interpoles—as described herein—such as to form four airgap slots for four stators or coil annuli (not shown). The fact that each of the rotors is in attraction to its neighbour further helps to stream and shape optimally the flux extending between them, and thus also to contribute to the augmentation of the generation of emfs within the coils.

A method which allows for magnetizing across edges of wide magnets, such as may be required if larger interpoles are required for significant diameter rotors (e.g. those having diameters of several meters) is illustrated with reference to FIG. 6. In this, two, three (as illustrated) or more thinner magnets, 75, 76 and 77—magnetised across their sides as hereinbefore disclosed—are manufactured and then brought together to form a single wider interpole, as shown at 78 with its sides magnetized North and South.

Measurements of the improvements in magnetic flux possible in the arrangement of the invention are now presented with reference to Table 1.

Tables of Magnetic Field Strengths (Unit kG)

Table A: Field strengths (taken from average of nine measurements) at rear and front faces of magnets in absence of ferromagnetic annulus Table B: Field strengths, front faces of magnets mounted on 6 mm backing sheet.

TABLE A

| without backing iron | | | | | | | | | |
|---|---|---|---|---|---|---|---|---|---|
| Principal Magnet A | | | Interpole | Principal Magnet B | | | Interpole | Principal Magnet C | |
| Rear side: | | | | | | | | | |
| 0.697 | 0.577 | 0.6 | 0.124 | 0.49 | 0.51 | 0.547 | 0.08 | 0.473 | 0.52 | 0.6633 |
| Gap Side: | | | | | | | | | |
| 0.826 | 0.84 | 1.026 | 0.087 | 1.05 | 0.907 | 1.09 | 0.158 | 1.03 | 0.83 | 0.91 |

Example 1: Average of averages: 0.48
Example 2: Average of averages: 0.796
Ratio: Example 1/Example 2: 60%

TABLE B

| with backing iron Gap side: | | | | | | | | | |
|---|---|---|---|---|---|---|---|---|---|
| Principal Magnet A | | | Interpole | Principal Magnet B | | | Interpole | Principal Magnet C | |
| 1.196 | 1.186 | 1.29 | 0.063 | 1.276 | 1.19 | 1.33 | 0.184 | 1.316 | 1.2 | 1.28 |

Example 3: Average of averages: 1.047
Ratio: Example 3/Example 2: 1.31

Referring to Table A of table 1, measurements of flux intensity across the rear and front faces of an arrangement of three principal permanent magnets sandwiching two intermediate permanent magnets, but without even the presence of a backing plate, are shown under Rear Side and Gap Side. Nine measurements were taken on each principal magnet—averaged to three as shown- and three measurements on each intermediate magnet, averaged to one. The ratios between the two sets is shown at Example 1/Example 2, namely 60%. This shows clearly that substantial fields are present at the rear face of the two sequences of magnets, as well as at their front surfaces.

Referring to Table B, backing iron of thickness 6 mm is now put in place with the same arrangement of magnets, and new values taken of the field strengths on the front faces (i.e. gap side). In this case, the strength of the fields across the front face increases by a very substantial measure, namely 31% as shown at Example 3/Example 2. This shows the efficacy of the use of the backing plate in both coupling the rear sides of the magnets, and enhancing the usable field strengths. In an embodiment the backing plate is at least 4 mm thick, preferably at least 6 mm thick. The thickness is preferably such that there is (on a single sided arrangement) substantially no magnetic flux on the rear side of the backing plate.

Note, it is the case with ferrite magnets that their magnetization during manufacture is not an exact science. Variations in both material composition and strength of field account for variations in the averages for the respective same positions across magnets.

Numerous variations will be apparent to those skilled in the art.

The invention claimed is:

1. A rotary generator comprising:
   at least one magnetic annulus pair comprising a first magnetic annulus and a second magnetic annulus with a gap therebetween;
   a coil annulus in the gap;
   the first and second magnetic annuli and the coil annulus having a common axis;
   the first and second magnetic annuli of the at least one magnetic annulus pair each having:
   a sequence of principle permanent magnets spaced around the common axis with alternating north and south poles facing the gap, corresponding principle permanent magnets of the first and second magnetic annuli of a magnetic annulus pair, with unlike poles facing the gap, facing each other across the gap such that lines of magnetic flux cross the gap between the corresponding principle permanent magnets, and
   a sequence of intermediate permanent magnets, each of the intermediate permanent magnets being positioned between two of the principle permanent magnets, each intermediate permanent magnet having adjacent the gap a north pole facing a side of the principle permanent magnet of the two principle permanent magnets having a north pole facing the gap and each intermediate permanent magnet having adjacent the gap a south pole facing a side of the principle permanent magnet of the two principle permanent magnets with a south pole facing the gap, the coil annulus having a sequence of coils arranged around the common axis such that the lines of magnetic flux cut the turns of the coils and thus induce electric currents in the coils as the magnetic annuli are caused to rotate relative to the coil annulus, wherein the first and second magnetic annuli of the at least one magnetic annulus pair each further comprise a backing plate of ferromagnetic material, the principle permanent magnets being positioned between the backing plate and the gap and mounted to the backing plate such that adjacent principle permanent magnets are magnetically coupled to one another through the backing plate, and a rotor of the generator comprising a plurality of the magnetic annulus pairs, adjacent magnetic annulus pairs sharing a common one of the backing plate such that, other than at axial end backing plates, each backing plate is populated on both sides with the sequences of principal and intermediate permanent magnets.

2. A rotary generator according to claim 1 wherein for a given size generator the ratio of the widths of the principle permanent and the intermediate permanent magnets together with the selection of the average width of the active portion of the layers of the stator coils used to generate emfs are each so determined such that the increase in the emfs generated in the coils is increased by at least 20% were there to be no interpoles present.

3. The rotary generator of claim 1, wherein at least one side of the principle permanent magnets which extend in the radial direction are curved, preferably convex or concave.

4. The rotary generator of claim 1, wherein at least one side of the intermediate permanent magnets which extend in the radial direction are curved, preferably convex or concave.

5. The rotary generator of claim 3, wherein the curves of the sides of the principle permanent magnets and the intermediate permanent magnets are complementary such that the one can nestle into the other.

6. The rotary generator of claim 1, further comprising ferromagnetic inserts of ferromagnetic material positioned between the intermediate permanent magnets and the principle permanent magnets.

7. The rotary generator of claim 1, wherein the intermediate permanent magnets extend in length radially inwardly closer to the common axis than the principle permanent magnets and/or the intermediate permanent magnets extend radially outwardly further from the common axis than the principle permanent magnets.

8. The rotary generator of claim 1, wherein the intermediate permanent magnets have a length in an axial direction of the rotary generator which is less than a length in the axial direction of the principle permanent magnets such that the corresponding principle permanent magnets are closer together than the distance between intermediate permanent magnets of the first magnetic annulus and intermediate permanent magnets of the facing second magnetic annulus.

9. The rotary generator of claim 1 in which the intermediate permanent magnet is constructed from a stack of laterally conjoined magnets each magnetized across their opposite sides and in attraction to its neighbour in such manner to provide a single interpole magnet of the desired overall width.

10. The rotary generator of claim 1, wherein the backing plate has a thickness of 4 mm or greater.

* * * * *